United States Patent Office 2,759,811
Patented Aug. 21, 1956

2,759,811

FERROUS ALLOY

Howard J. Petry, Oxford, Ohio

No Drawing. Application July 2, 1953,
Serial No. 365,783

10 Claims. (Cl. 75—128)

This invention relates to alloy steels and more particularly to an alloy for use as a welding metal, the same being manufactured in the form of a rod, wire or rolled steel product suitable for use in forming welds between metal parts.

It is an object of the invention to provide an alloy steel of this character which is tough and impact resistant but is easy to apply or deposit and possesses a high resistance to abrasion.

Another object of the invention is to provide a welding alloy steel which is in the form of a coated rod for manual use and as a bare wire for submerged arc use.

Heretofore it has been known to weld metal plates together employing stainless steels and other alloys which contain relatively high chromium, but these alloys have been difficult to work with and their resistance to abrasion and impact is not as high as would be desired.

In accordance with the present invention an improved welding alloy is provided having excellent resistance to abrasion and impact and which can be utilized to weld metal plates and provide a weld deposit exhibiting high resistance to abrasion and impact and one which is corrosion resistant.

The welding alloy of the present invention comprises approximately 10% to 18% alloy constituents with the balance iron. A preferred form of the present invention consists of an alloy steel comprising manganese, nickel and chromium as principal alloying constituents, the total content of manganese and nickel together being approximately equal to the percentage amount of chromum. An alloy steel of this composition can be worked, for example, by forging or rolling so as to produce a rolled steel in the form of a rod or wire for use in welding. A coating of the alloy may also be applied onto a weld rod, if desired.

The alloy of the invention may be used in the production of steel castings, extruded steel shapes, and as applicator bars and the like, e. g. wedge bars for shovel teeth, tractor grouser bars, etc.

The steel alloys of the present invention may be produced in conventional forms such as are fabricated using mild steels.

The preferred range of the alloy constituents are as follows:

| Composition: | Percent |
|---|---|
| Carbon | 0.15–1.50 |
| Silicon | 0.50–1.00 |
| Manganese | 3.00–3.75 |
| Chromium | 5.50–7.25 |
| Nickel | 2.50–3.50 |
| Sulphur | 0.025% Max. |
| Phosphorus | 0.025% Max. |
| Cobalt and molybdenum | Trace |
| Iron | Balance |

A particular useful alloy as a welding rod is one wherein the sum of the manganese and nickel percentage amounts of the alloy substantially equal the percentage amount of chromium in the alloy, the chromium approximating 6% with 3% nickel and 3% manganese.

The welding rod, wire, rolled steel or coated rod, will comprise an alloy such as will produce a weld deposit having a composition of the foregoing analysis. Such a weld deposit exhibits the characteristic abrasion and impact resistance weld having the desired inherent toughness. In this manner a weld deposit is provided which, itself, has the desired characteristic of the alloy steel. Such weld deposits utilizing the welding alloy of the present invention have high ductility and good tensile strength and are resistant to corrosion and impact.

The weld metal alloy is relatively easy to apply and has good flow characteristics, being further characterized in that the weld is very tough and impact resistant. Suitable rods for welding purposes can be produced by employing alloy steel as a coating for a welding rod. Further, in the use of the alloy when the silicon content is upwards of 1% the carbon content is preferably kept low so that the improved results of a weld and weld deposits can be obtained. The weld deposit is tough and impact resistant due to the presence of relatively high percentages of manganese and nickel and the presence of chromium together with nickel produces a high tensile strength corrosion resistant alloy steel which is particularly useful as a welding alloy.

What is claimed is:

1. A welding rod for welding metal parts, said rod consisting of a ferrous alloy containing about 0.50% to 1% silicon, about 0.15% to about 1.25% carbon, about 3½% manganese, about 2½% nickel and about 6% chromium.

2. A weld deposit comprising a ferrous alloy consisting of a ferrous alloy containing carbon in amounts of from about 0.15% to about 1.50%, silicon about 0.50% to about 1%, and chromium, manganese and nickel, manganese comprising from 3.0 to 3.75%, the percentage amount of said chromium being substantially equal to the sum of the percentage amount of manganese and nickel, said nickel amounting to at least 2½%.

3. A weld deposit comprising a ferrous alloy consisting of a ferrous alloy containing a low carbon content, chromium from about 5% to about 7%, together with manganese and nickel, said manganese and nickel content totalling the same amount as chromium, said manganese amounting to 3%.

4. A weld deposit comprising a ferrous alloy consisting of a ferrous alloy containing about 0.50% to 1% silicon, about 1.15% to about 1.25% carbon, about 3½% manganese, about 2½% nickel and about 6% chromium.

5. A weld deposit comprising a ferrous alloy consisting of carbon in the amount from about 0.15% to about 1.50% chromium, manganese and nickel, said nickel being from 2.50 to 3.50%, said manganese and nickel totalling an amount substantially the same as chromium, said chromium being between about 5% to about 7%, said deposit forming a tough impact resistant weld, said manganese amounting to at least 3%.

6. A weld deposit comprising a ferrous alloy consisting of carbon in amounts of from about 0.15%, to about 1.50%, silicon from about 0.50% to 1%, chromium from about 5% to about 7%, manganese from about 3% to about 4% and nickel from about 2.50% to about 3.50%, said deposit being extremely tough and impact resistant.

7. The combination of spaced metal parts and a weld deposit joining said parts, said deposit consisting of a ferrous alloy containing carbon in amounts of from about 0.15% to about 1.50%, silicon about 0.50% to about 1%, and chromium, manganese and nickel, manganese being from 3.0 to 3.75%, the percentage amount of said chromium being substantially equal to the sum of the percentage amount of manganese and nickel, said nickel amounting to at least 2½%.

8. An alloy consisting of a ferrous alloy containing carbon in amounts of from about 0.15% to about 1.50%, silicon about 0.50% to about 1%, and chromium, manganese and nickel, said nickel being from 2.50 to 3.50%, the percentage amount of said chromium being substantially equal to the sum of the percentage amount of manganese and nickel, said manganese amounting to at least 3%.

9. An alloy consisting of a ferrous alloy containing carbon in the amounts of from about 0.15% to about 1.50%, silicon from about 0.50% to 1%, chromium from about 5% to about 7%, manganese from about 3% to about 4% and nickel from about 2.50% to about 3.50%, said deposit being extremely tough and impact resistant.

10. An alloy steel for use as welding rods and applicator bars consisting of a ferrous alloy containing carbon in the amount from about 0.15% to about 1.50% chromium, manganese and nickel, said nickel being from 2.50 to 3.50%, said manganese and nickel totaling an amount substantially the same as chromium, said chromium being between about 5% to about 7%, and said manganese being at least 3%, said deposit forming a tough impact resistant weld.

References Cited in the file of this patent

UNITED STATES PATENTS

| | | |
|---|---|---|
| 1,905,247 | Scott | Apr. 25, 1933 |
| 2,343,643 | Cape et al. | Mar. 7, 1944 |

FOREIGN PATENTS

| | | |
|---|---|---|
| 484,835 | Great Britain | May 11, 1938 |